(12) United States Patent
Hiller et al.

(10) Patent No.: US 6,675,642 B1
(45) Date of Patent: Jan. 13, 2004

(54) DEVICE FOR DETECTING THE SLIP OF A DRIVING BELT OF A GENERATOR DRIVEN BY A DRIVING MOTOR

(75) Inventors: Burkhard Hiller, Oberriexingen (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/110,373

(22) PCT Filed: Sep. 27, 2000

(86) PCT No.: PCT/DE00/03398

§ 371 (c)(1),
(2), (4) Date: Jul. 22, 2002

(87) PCT Pub. No.: WO01/29960

PCT Pub. Date: Apr. 26, 2001

(30) Foreign Application Priority Data

Oct. 15, 1999 (DE) ........................................ 199 49 824

(51) Int. Cl.[7] .............................................. G01M 19/00
(52) U.S. Cl. ...................................................... 73/118.1
(58) Field of Search ................................ 73/116, 118.1

(56) References Cited

U.S. PATENT DOCUMENTS 4,263,578 A    4/1981  Fukuhara

FOREIGN PATENT DOCUMENTS

DE    43 25 505 A1    2/1994
JP    10 150741       6/1998

OTHER PUBLICATIONS

Patent Abstracts of Japan vol. 011, No. 269 (M–621) Sep. 2, 1987 & JP 62 072948 A, Apr. 3, 1987.

*Primary Examiner*—Edward Lefkowitz
*Assistant Examiner*—Maurice Stevens
(74) *Attorney, Agent, or Firm*—Michael J. Striker

(57) ABSTRACT

According to the invention, an apparatus for detecting slip of a drive belt (4) of a generator (1) driven by a drive motor (2) is proposed, in which the slip of a drive belt (4) can be determined by observation of the on-board electrical system voltage ($U_b$) and of the signal course at the terminal (DF) of the generator (1). For determining the slip, the largest possible electrical load (10) is switched, and the voltage course of the on-board electrical system voltage ($U_b$) before and after the switching of the electrical load (10) is evaluated. By additional observation of the signal at the terminal (DF) of the generator (1), it is precluded that electrical consumers that are not observed could adulterate the result.

11 Claims, 1 Drawing Sheet

Figure 1:
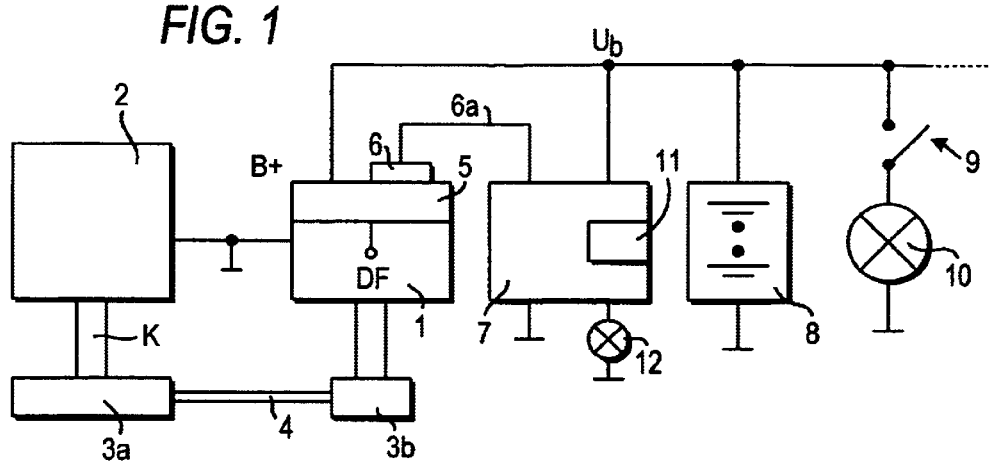

DEVICE FOR DETECTING THE SLIP OF A DRIVING BELT OF A GENERATOR DRIVEN BY A DRIVING MOTOR

PRIOR ART

The invention is based on an apparatus for detecting slip of a drive belt between a generator and the drive motor, as generically defined by the preamble to the main claim.

From German Patent Disclosure DE 43 25 505 A1, an electronic control unit for motor vehicles is already known in which the idling rpm of the engine is controlled as a function of the load at the generator. When there is a load on the generator, the idling rpm is raised, while upon relief of the generator the rpm is lowered, to reduce fuel consumption by the motor vehicle. An unfavorable aspect of this control unit is that only an rpm adaptation as a function of the load on the driven generator is done, but not any monitoring whether the torque furnished by the drive motor is in fact transmitted to the shaft of the generator. If drive belt slip occurs, that is, if the V-belt slips on the pulley, then the requisite torque, despite the raising of the idling rpm of the engine, cannot be transmitted and lead to a battery discharge, since the drive belt slip has not been detected and the error can accordingly not be corrected.

ADVANTAGES OF THE INVENTION

The apparatus of the invention for detecting slip of a drive belt of a generator driven by a drive motor, having the characteristics of the body of the main claim, has the advantage that a slipping drive belt (slip) can be detected immediately, and thus advantageously a poor battery charge or a creeping discharge of the battery is avoided over a longer period of time. It is especially advantageous that by detection of the slipping drive belt, problems in the coolant system can be revealed under some circumstances as well, since often the water pump is also driven by the drive belt of the generator.

By the provisions recited in the dependent claims, advantageous refinements of and improvements to the apparatus defined by the main claim are possible.

It is especially advantageous that the load of the generator is also picked up by way of the voltage course at the terminal DF. By the determination of the electrical load acting on the generator, a simple capability is obtained of monitoring the load switched for the sake of the monitoring, such as a fan or some other consumer that is as large as possible. Additional consumers that have been turned on randomly can be detected and eliminated by the comparison with the switched load.

It is also advantageous that the determination of the change in the on-board electrical system voltage is repeated if the comparison with the predetermined limit value leads to an error. By displaying the error or outputting a warning signal, the driver is either immediately told to go to a repair facility, or—depending on its urgency—the error can be stored in memory and taken care of the next time the vehicle is serviced.

It is also advantageous that the determination of the load of the drive motor is effected at a predetermined rpm, since for this rpm for the predetermined electrical load, only a comparison value has to be stored in memory. If more than one rpm value is used, then advantageously the associated comparison value for each rpm should be stored in memory.

It is also considered especially advantageous that the apparatus is used in the form of a control program in an already existing control unit for engine or vehicle functions. This largely eliminates additional hardware expense.

It is also favorable for an error that has occurred to be stored in a memory of the apparatus, so that it can be read out at any time and battery failure, for instance, caused by a discharge state can thus be explained.

DRAWING

One exemplary embodiment of the invention is shown in the drawing and explained in further detail in the ensuing description.

FIG. 1 is a block circuit diagram, and

FIGS. 2a–e and 3a–e show graphs with and without slip of a drive belt.

DESCRIPTION OF THE EXEMPLARY EMBODIMENT

One exemplary embodiment of the invention will be described below in conjunction with the drawings and explained in further detail in terms of its mode of operation.

The block circuit diagram of FIG. 1 first schematically shows a current flow chart. A generator 1 is disposed in terms of three dimensions relative to a drive motor 2 such that a pulley 3a and 3b on the crankshaft K of the drive motor 2 and on a shaft of the generator 1 are driven via a drive belt 4. The rpm of the rotor of the generator 1 is dependent on the rpm of the drive motor 2, because of the gear ratio of the two pulleys 3a and 3b. At a high rpm of the drive motor 2, the rpm of the generator 1 is correspondingly high and conversely is correspondingly low. However, if the drive belt 4 is not taut enough, then a difference (slip) between the two rpm values can result, since the drive belt 4 as a rule slips on the smaller pulley 3b. The torque furnished by the drive motor 2 cannot then be fully transmitted to the armature of the generator 1. The greater the slip of the drive belt 4 becomes, the lower is the torque that can be transmitted, especially if the generator 1 is loaded with a large electrical load 10.

In electrical terms, the generator 1, on which a regulator 5 is mounted, is connected to an apparatus 7, for instance via an interface 6. The connecting line 6a serves to measure the voltage at the internal terminal DF of the generator 1. The generator 1 is also connected via its output terminal B+ to a battery 8 and charges the battery. Further current circuits are connected to the same line. FIG. 1, for the sake of simplicity, shows only one current circuit, which comprises the series circuit of a switch 9 and the electrical load 10. The apparatus 7 is also connected by a terminal to the on-board electrical system voltage $U_b$ and to a display 12. The apparatus 7 is furthermore connected to a memory 11 for data and programs.

In a further feature of the invention, it is provided that the apparatus 7 is a component of a control unit for engine or vehicle functions that is present anyway and that for its own operation is already connected to the on-board electrical system voltage $U_b$. It preferably includes a control program, with which the voltage changes are measured before or after the electrical load 10 is switched on and/or after the electrical load 10 on. The slip of the drive belt 4 is then determined from this.

Figure 2:
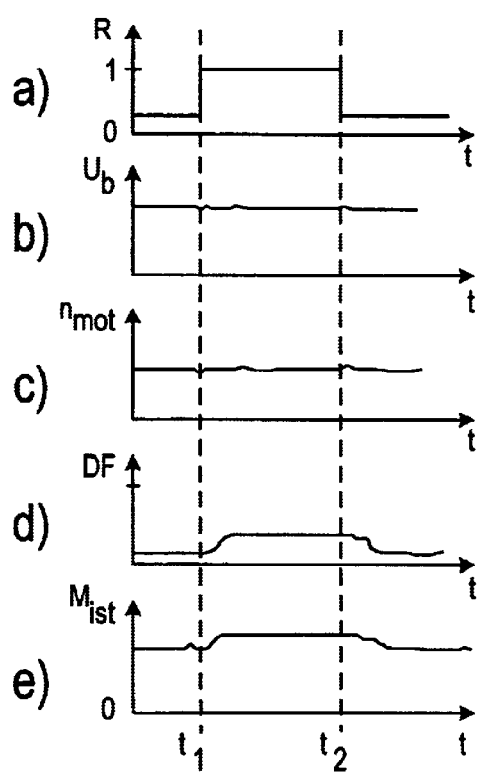

The mode of operation of this apparatus will now be described in further detail in terms of FIGS. 2 and 3.

FIGS. 2a–2e show graphs of a drive belt 4 that has no slip or only a very slight slip.

Figure 3:
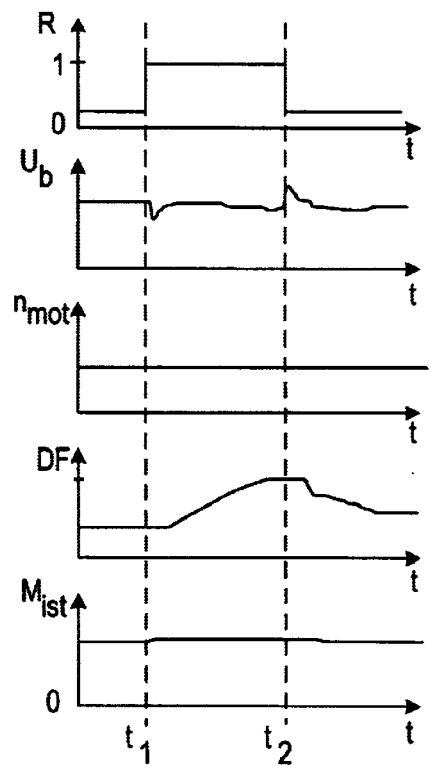

In FIG. 3, conversely, graphs a) through e) are shown in which the drive belt 4 has a pronounced slip.

In FIGS. 2a and 3a, at time $t_1$ (on the X axis), the electrical load 10 is switched on via the switch 9, and it is switched off again at time $t_2$. Since the load is the same in both cases, the curves in FIGS. 2a and 3a are also identical. To simplify the evaluation, it assumed for the further graphs that the switched electrical load 10, for instance a switched fan, is relatively large. It is also assumed that the drive motor 2 is in steady-state operation and is running at idling rpm, for instance. This has the advantage that interference and changes in the actual torque are slight and thus the outcome of measurement is not made wrong. It is also advantageous that this testing be done in the overrunning mode of the engine, because interference in the electrical power levels are slight because of the absence of injection signals and possibly ignition signals.

As can be learned from FIG. 2e, the torque $M_{ist}$ that is exerted by the drive motor 2 is increased markedly as a result of the switching on of the electrical load 10. The reason for this is that because of the generation of the electric current, the generator 1 furnishes a braking moment, which must be overcome by the drive motor 2 or in other words the internal combustion engine.

In FIG. 3e, the increase in the torque $M_{ist}$ is not so markedly apparent, since the generator 1 is braked just as in the example of FIG. 2e, but because of the slip of the drive belt 4, the drive motor 2 cannot exert the requisite torque $M_{ist}$. As a result, the battery 8 can become discharged over the long term, since more current is drawn from it than is supplied.

Since as a rule torque is difficult to measure and would require an additional sensor, it is proposed according to the invention that the on-board electrical system voltage $U_b$ be measured upon turn-on and turn-off, preferably at the point where the control unit for the motor with the apparatus 7 is disposed. FIGS. 2b and 3b show corresponding voltage courses of the on-board electrical system voltage $U_b$. While in the example without slip of the drive belt 4 the on-board electrical system voltage $U_b$ exhibits only slight changes (FIG. 2b), in the case of FIG. 3b upon turn-on of the electrical load 10, a marked dip in the voltage level can be observed after time $t_1$. After the electrical load 10 is turned off at time $t_2$, a corresponding voltage rise can be seen. These differences compared to the voltage course of FIG. 2b are a measure of the slip of the drive belt 4. FIGS. 2c and 3c show the course of the rpm $n_{mot}$ of the drive motor 2. In the case of FIG. 2c, the rpm $n_{mot}$ varies as a function of the electrical load 10, since there is no slip in the drive belt 4. In the case of FIG. 3c, conversely, the rpm $n_{mot}$ is constant.

FIGS. 2d and 3d show the course over time of the signal at the terminal DF, which is representative for the electrical load 10 of the generator 1. The DF signal represents the pulse duty factor between the ON time and OFF time of the generator excitation. To preclude the engine control unit from turning other electrical consumers on or off during the measurement, it can be monitored by comparison of the DF signals whether only the electrical load 10 that has actually been switched has contributed to the voltage change of the on-board electrical system voltage $U_b$. It should be noted in general that the regulator 5 seeks to compensate for a load change on the generator 1 by increasing the ON time of the exciter current. Upon a reduction in the generator load, the ON time is reduced accordingly. The regulation is effected such that the predetermined generator set-point voltage is attained. In FIG. 2d, after the electrical load 10 has been compensated for, the pulse duty factor is therefore constant (horizontal portion of the curve) in the time range from $t_1$ to $t_2$. In the case where there is slip in the drive belt 4, shown in FIG. 3d, the curve conversely rises in the time range $t_1$ to $t_2$. This means that the regulator is seeking to reregulate the pulse duty factor at the terminal DF in order to compensate for the slip of the drive belt 4. The increase is disproportionate and can thus also be utilized, as an alternative embodiment, for evaluating the belt slip. Depending on the magnitude of the slip of the drive belt 4, it can happen, depending on the load state of the battery, that the set-point value of the on-board electrical system voltage $U_b$ will not be attained. If that set-point value is not attained, the consequence can be a discharge of the battery 8.

In a further feature of the invention, it is provided that, a torque-guided engine management system, a lost moment of the motor be determined by adaptation. In this process, during idling, the deviation in the lost moment from a fixedly predetermined pilot value is ascertained. The integral component of idling regulation can be used as the measure of this. Preferably during idling, this integral component can be utilized to detect changes in the lost moment that are caused by a change in the generator load. If there is not a large enough change when a consumer is turned on, then V-belt slip is occurring.

Alternatively, it is also possible to measure or vary the moment directly by using a moment sensor.

The comparison values for the slip of a drive belt 4 are advantageously stored in the memory 11 and used for the comparison. In this way, the magnitude of slip of the drive belt 4 can advantageously be determined.

What is claimed is:

1. An apparatus for detecting slip of a generator (1), having a drive motor (2) which by pulleys (3) and a drive belt (4) drives the generator (1), and having a switch (9) for turning an electrical load (10) in the current circuit of the generator (1) on and off, characterized in that the apparatus (7) has means for detecting voltage changes, corresponding to a change in torque of the drive motor (2), before and after the electrical load (10) is turned on and/or off, and that the apparatus (7) is embodied to detect slip of the drive belt (4) by comparison of the detected voltage change with a predetermined limit value.

2. The apparatus of claim 1, characterized in that the detected voltage changes are changes in the on-board electrical system voltage ($U_b$).

3. The apparatus of claim 1, characterized in that the apparatus (7), for determining the electrical load (10) of the generator (1), detects the voltage course at a terminal (DF).

4. The apparatus of claim 1, characterized in that engine rpm can be ascertained from the voltage changes.

5. The apparatus of claim 1, characterized in that the determined load of the generator (1) is comparable to the switched electrical load (10).

6. The apparatus of claim 1, characterized in that the determination of the voltage change is repeated if in the comparison a predetermined limit value has been exceeded.

7. The apparatus of claim 4, characterized in that when the predetermined limit value is exceeded, a warning signal can be output.

8. The apparatus of claim 1, characterized in that the determination of the load of the drive motor (2) can be performed at a predetermined rpm, preferably the idling rpm of the drive motor (2).

9. The apparatus of claim 1, characterized in that the apparatus (7) has a control program for performing the slip detection of the drive belt (4).

10. The apparatus of claim 1, characterized in that the apparatus (7) is a component of an engine or vehicle control unit.

11. The apparatus of claim 1, characterized in that the apparatus (7) has an error memory (11).

* * * * *